(Model.)
G. W. ZEIGLER.
COMBINED TRESTLE SOCKET AND CLAMP.
No. 318,154. Patented May 19, 1885.
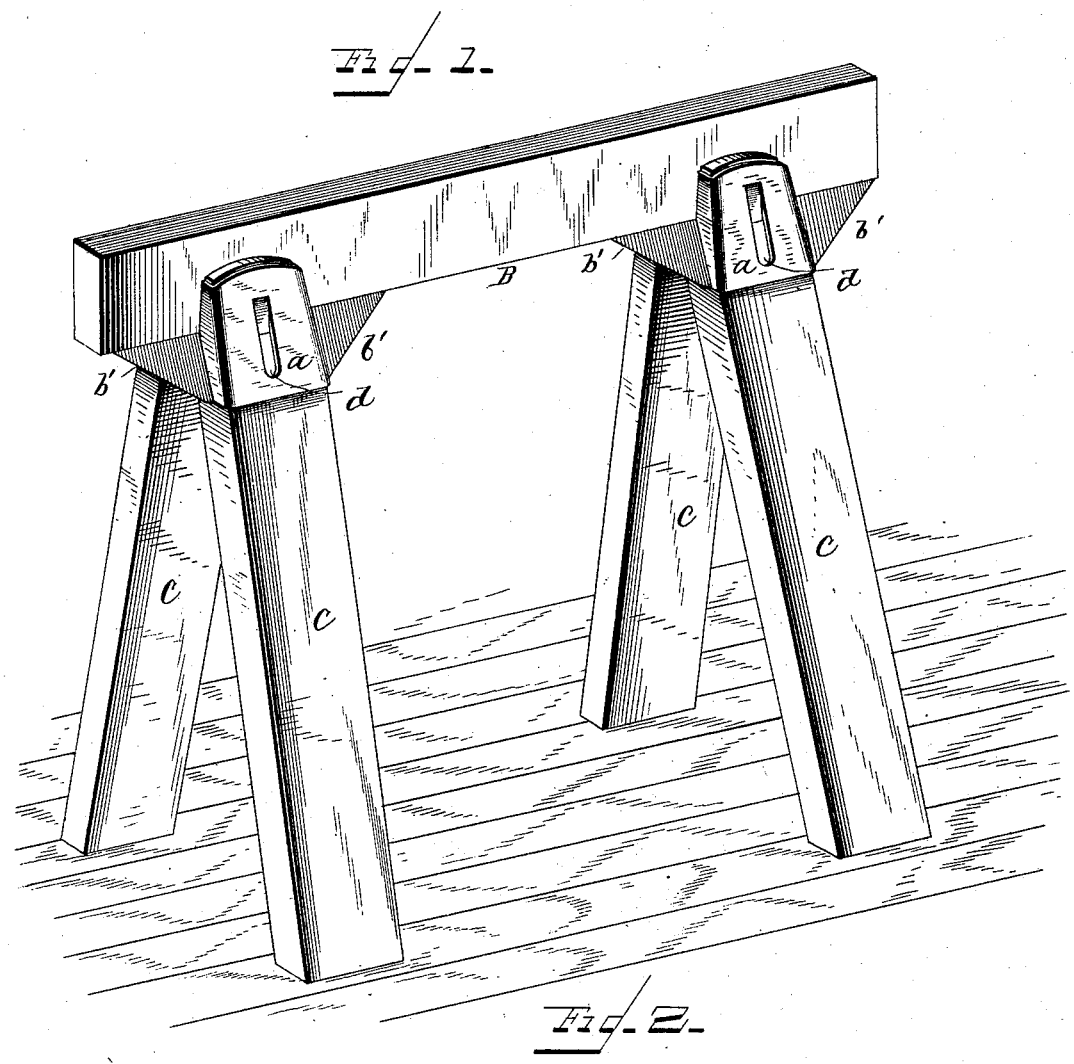
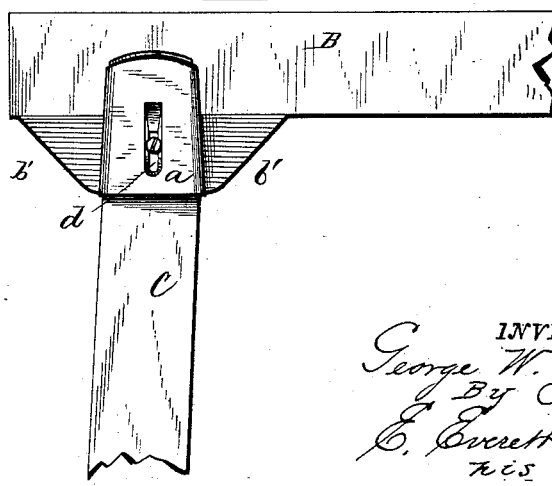
WITNESSES
F. L. Ourand
J. Sargent Elliott
INVENTOR
George W. Zeigler
By E. Everett Ellis
his Attorney (Model.)
2 Sheets—Sheet 2.
G. W. ZEIGLER.
COMBINED TRESTLE SOCKET AND CLAMP.
No. 318,154. Patented May 19, 1885.
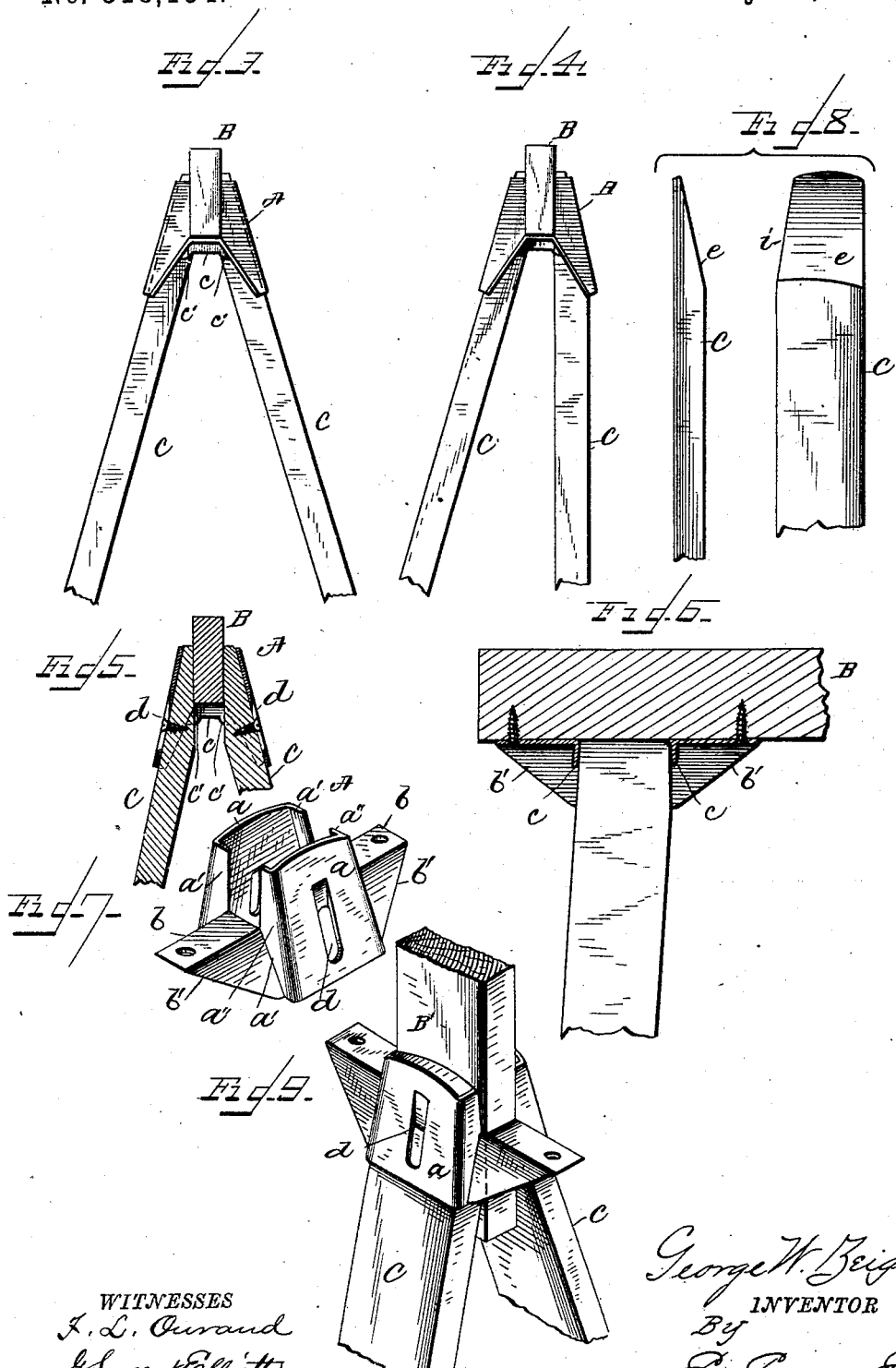
WITNESSES
INVENTOR
George W. Zeigler
By
E. Everett Ellis
His Attorney

UNITED STATES PATENT OFFICE.

GEORGE W. ZEIGLER, OF WASHINGTON, DISTRICT OF COLUMBIA.

COMBINED TRESTLE SOCKET AND CLAMP.

SPECIFICATION forming part of Letters Patent No. 318,154, dated May 19, 1885.

Application filed April 1, 1885. (Model.)

*To all whom it may concern:*

Be it known that I, GEORGE W. ZEIGLER, a citizen of the United States, residing at Washington, in the District of Columbia, have invented certain new and useful Improvements in Combined Truss Socket and Clamp for the Support of Structures; and I do hereby declare the following to be a full, clear, and exact description of the invention, such as will enable others skilled in the art to which it appertains to make and use the same.

This invention has relation to a combined metal socket and clamp designed for use in connection with stationary or portable trestles or horses for supporting scaffolding, roofs, posts, beams, and superposed structures of all kinds, whether the same be permanently or temporarily constructed.

In the erection of scaffolding or other superposed structures of frame-work the principal object is to have the parts as light as possible, and at the same time of the greatest strength attainable from their proportions, so that they will be able to withstand the strain imposed upon them by the weight they may be designed to support. The plan usually followed, therefore, in the construction of a scaffold is to employ comparatively light material for the frame-work, and to support such frame-work on trestles or trusses in which the entire weight or strength of the structure is concentrated.

My invention was devised for the purpose of rendering capable the adjustment of the posts or braces of which the trestle is constituted, or, in other words, to adapt them to be brought to various angles or degrees of pitch with respect to the structure which they support, by which a very great height and weight may be safely supported. It being essential with each increment of height in a structure, which, in the first instance, may have been constructed on a predetermined scale or in any lateral additions thereto, that its base be correspondingly increased or changed, the advantages of my invention in permitting the performance of such changes will be apparent. So, too, will my invention be found quite valuable in the sense of a clamp for holding together the opposing ends of the legs in such rigid and secure a manner as to absolutely prevent accidental disunion thereof, and also does it possess the feature of a socket for the reception of a tie or cross beam.

The invention consists, substantially, in the combined socket and clamp as constructed, and in the particular combinations to be hereinafter distinctly described and claimed.

Referring to the accompanying sheets of drawings, Figure 1 is a perspective view of legs and tie or cross beam, in connection with which my invention is embodied; and Fig. 2 is a side elevation thereof, partly broken off. Figs. 3 and 4 represent end views of my invention, in which the legs or supports are shown as set at different angles or degrees of pitch. Figs. 5 and 6 are sectional detail views to more clearly indicate the construction of parts. Fig. 7 is a perspective view of the socket-clamp proper. Fig. 8 is a detail view, showing the manner in which the ends of the legs or supports are beveled or chamfered, by which the desired inclination is given them when properly located and clamped within the socket; and Fig. 9 represents a perspective view of another form of the arrangement of beam and legs.

With reference to the several parts by the letters marked thereon, I will first proceed to describe the construction of socket-clamp, and then follow in regular order with a description in detail of the construction of remaining parts, together with an explanation as to the manner in which different inclinations or angles of the braces are obtained.

This socket-clamp I propose to form of malleable iron, as that metal, being very tenacious, is more capable of withstanding enormous strain, and is less susceptible to breakage or rupture than ordinary cast-iron. The said socket-clamp is represented as a whole at A, and is constructed of two slightly-tapering sides, $a$ $a$, inclining toward each other at the top at a suitable angle, and extending inwardly at its sides, as at $a'$, forming an angular section, $a''$, thence terminating at each end with extensions or brackets $b$ $b$, the upper surfaces of which constitute a rest or support for a tie or cross beam. It will be observed that the sides $b'$ $b'$ of the brackets $b$ $b$ slant downwardly or inwardly from their extremity to the point at which they intersect with the angular sections $a'$ $a'$, thus forming a brace therefor against the edges of the legs, by which any undue strain imposed upon the tie or cross beam lengthwise or in the direction of length of the bracket-sides will be received by said sides and distributed or communicated to the remaining portions of the entire socket-clamps, as well also as to the supporting braces or posts themselves, thereby counteracting the effect of any inequality of strain that may be imposed thereon from those directions. In like manner the two main sides $a$ $a$, by being inclined toward each other at a suitable angle, will serve to receive all lateral strains and act to disperse or distribute the same to the other portions of the socket-clamp. Uniting with the two main sides at a point just outside of the angle formed at $a'$ and between said sides are webs $c$, formed at their points of intersection with said sides with diagonal portions $c'$ $c'$. These portions act to strengthen the two main sides in that they compensate for any loss of strength that may possibly result from the formation of the angle at $a'$. In addition to that, however, they assist in receiving a portion of all strain exerted to the device.

For all practicable purposes it will only be necessary to clamp the legs within the sockets, as is shown in the several figures, and to be hereinafter described; but for the purpose of adjustment of either one of the braces, when too long, and securing it, I have formed each of the sides $a$ $a$ with vertically-elongated slots or openings $d$ $d$, having a chamfered edge and terminating at the top in a gradually-inclined edge or web. When an adjustment of either one of the legs is desired to be effected, a screw is inserted in the side of the trestle-braces through the slot, (see Fig. 5,) the braces or legs tapped at the top until brought on a level, and the screw then tightened; also have I formed screw-openings in the top of the brackets $b$, by which the tie-beam is secured in place by screws, as represented in Fig. 6. The slots $d$ in the sides $a$, as well also as the screw-holes, may not be provided; but for the purpose of completeness I prefer that they should.

The brackets $b$ supply an extended bearing for the cross-beam, while the sides $a$ $a''$ rise or project above the upper surface of said brackets sufficiently to form supports for the sides of the tie-beam, as shown.

It will be obvious from the foregoing that a trestle embodying my invention in connection therewith will be capable of supporting a structure of considerable weight with perfect security.

Having set forth the nature of construction of the socket-clamp, I will now proceed to explain several employments of the legs therewith.

Directing attention to Figs. 1, 2, and 3, it will be seen that the legs C C are set at about the ordinary angle, and the cross or tie beam B placed within its supports. To attain the angle shown in said figures, the upper opposing sides of the legs C are beveled or chamfered, as represented at $e$, Fig. 8, and then inserted from beneath into the pockets formed by the sides $a$ $a''$ $a$ $a''$, and it will be apparent that the greater the weight imposed upon the legs the tighter will the braces or legs C become wedged in A. To obtain an increased pitch or angle of said braces, it is simply necessary to remove them and bevel them off more at $e$, and replace them as before. By reversing the sides of the braces they may be brought to a vertical position.

Fig. 9 illustrates the manner of placing a vertical beam or post between the legs to be supported. Instead, however, the standard or post B' may be placed between the legs when vertically set, and auxiliary iron braces employed for bracing said legs laterally.

When it is desired to place the legs or braces C C at an oblique angle to each other, an edge as well as the sides of said braces is beveled, as at $i$, Fig. 8, and they are inserted into the socket with the bevels $i$ at diagonally-opposite positions, this providing a greatly-increased span, by which a structure of great height is better supported.

In Fig. 4 is shown the manner of obtaining a vertical leg or support having a brace inclined thereto, this being effected by inserting the braces C C with the beveled side $e$ of one opposite to the straight side of the other. By inserting the braces C C into the socket with their beveled faces and edges corresponding to each other, they will be caused to tend outwardly or in the direction of the ends of the beam B, as well as away from each other. Should the braces or legs not set level, it is simply necessary to tap the one at the top having shortest length, whereupon the other will be correspondingly raised.

Having thus described my invention, what I claim is—

1. The combination, with the legs or braces, of a socket-clamp formed of two sides inclining toward each other at the top, and having lateral brackets extending at right angles thereto, substantially as described.

2. The combination, with the legs or braces, of a socket-clamp formed in one piece, and consisting of two tapering sides inclining toward each other at the top, and lateral brackets extending at right angles thereto, substantially as described.

3. The combination, with the legs or braces, of a socket-clamp formed of two sides inclining toward each other at the top, and having lateral brackets extending therefrom, said sides extending above the brackets to form lateral supports for a tie-beam, substantially as described.

4. The combination, with the legs or braces, of a socket-clamp formed of two sides inclining toward each other at the top, and extending inward at opposite points, as at $a'$, and terminating at each end with a bracket for the support of a tie-beam, substantially as described.

5. The combination, with the legs or braces, of a socket-clamp formed of two sides inclining toward each other at the top, and extending inwardly at opposite points, as at $a'$, and terminating at each end with a lateral extension or bracket for the support of a tie-beam, said sides proper extending above the top of the brackets for the lateral support of said beam, substantially as described.

6. The combination, with the legs or braces, of a socket-clamp formed of two sides inclining toward each other at the top, and terminating with end brackets or extensions, said sides having each an elongated slot, whereby the legs may be adjusted and secured by a screw, substantially as described.

7. The combination, with the legs or braces, of a socket-clamp formed of two sides inclining toward each other at the top, extending inward, as at $a'$, to form sections $a''$, and terminating at each end with brackets $b$, said brackets having sides $b'$ inclining toward their points of intersection with $a''$, substantially as and for the purpose described.

8. The combination, with the legs or braces, of a socket-clamp formed of two sides inclining toward each other at the top, and having brackets $b$ $b$ and the inward extension $a'$ $a'$, said sides rising above the brackets, and the webs $c$ $c$ uniting the sides at a point outside of the inward extension, substantially as described.

9. The combination, with the socket-clamp, constructed substantially as described, of legs or braces having beveled sides and edges, whereby they may be placed within the socket at various angles or degrees of pitch, as set forth.

10. The combination, with the socket-clamp, formed substantially as shown and described, of legs having beveled edges or sides, whereby they may be secured within the socket at an angle or incline, as set forth.

In testimony whereof I affix my signature in presence of two witnesses.

GEORGE W. ZEIGLER.

Witnesses:
E. EVERETT ELLIS,
M. P. CALLAN.